June 13, 1950 R. A. GRADEN 2,511,256
THERMOSTATIC CONTROL SWITCH
Filed Sept. 25, 1947 2 Sheets-Sheet 1
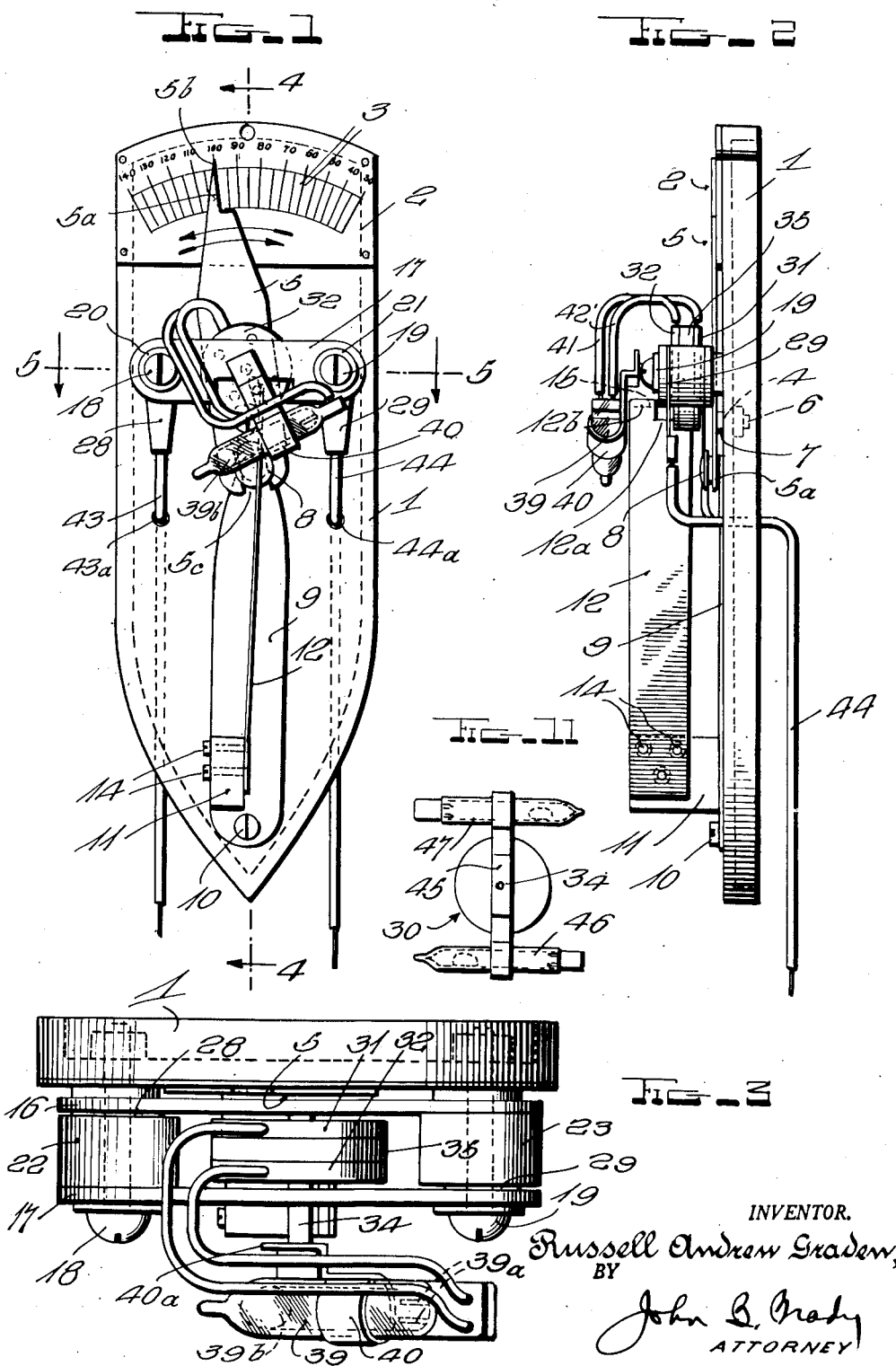
INVENTOR.
Russell Andrew Graden,
BY
John B. Brady
ATTORNEY

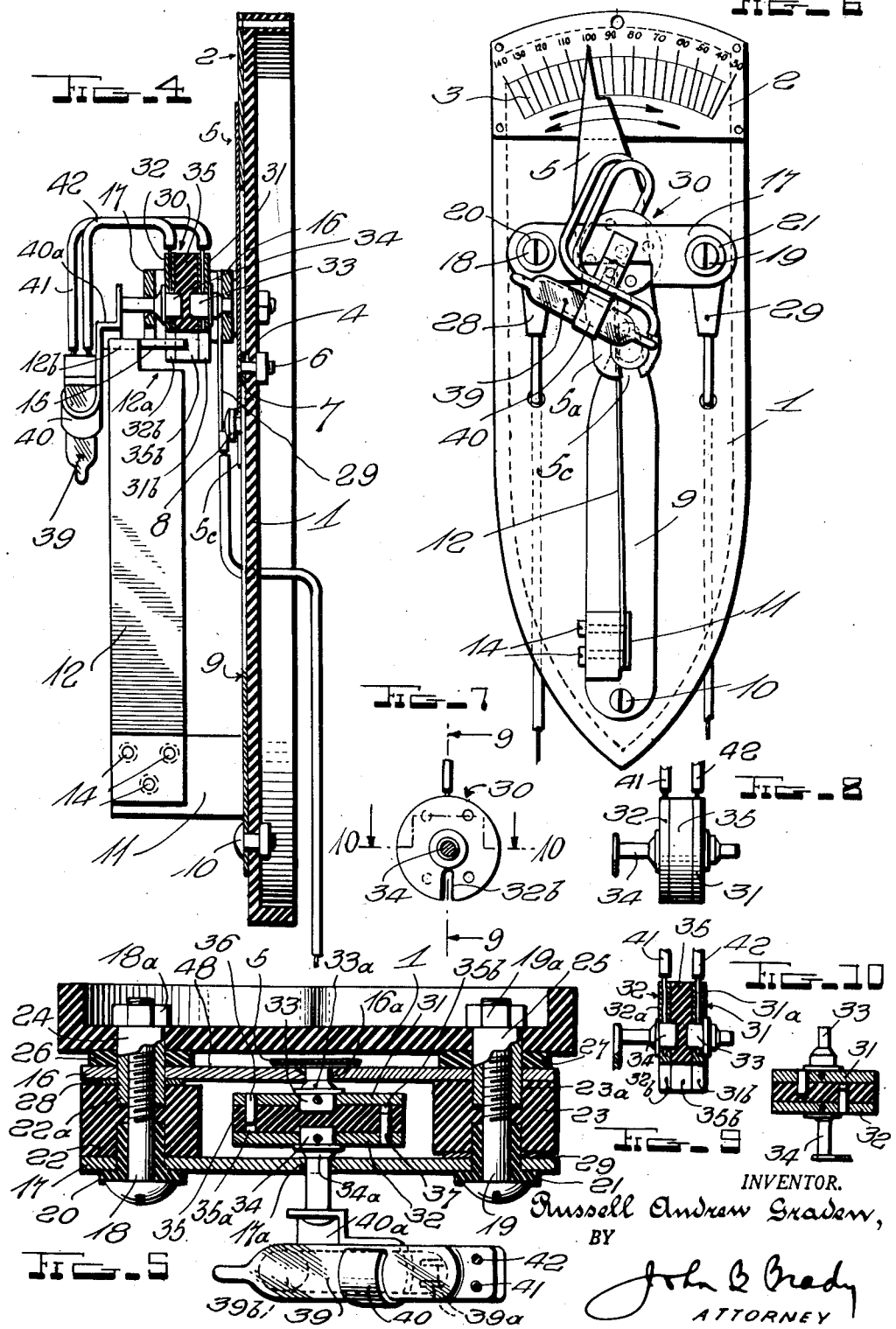

Patented June 13, 1950

2,511,256

UNITED STATES PATENT OFFICE 2,511,256

THERMOSTATIC CONTROL SWITCH

Russell Andrew Graden, Millville, Pa., assignor of two-thirds to Ralph Charles Graden, Harrisburg, Pa.

Application September 25, 1947, Serial No. 776,136

8 Claims. (Cl. 200—139)

My invention relates broadly to thermostats and more particularly to an improved simplified construction of thermostat having a high degree of sensitivity for the control of electrical circuits under conditions of changes in temperature.

One of the objects of my invention is to provide an improved construction of mercury switch thermostat including a highly sensitive thermostatic element operative under conditions of changes in temperature for actuating the mercury switch at any adjusted setting of the device.

A further object of my invention is to provide an improved construction of mercury switch thermostat having a minimum number of parts associated with a thermostatic element adapted to angularly flex, in its position under conditions of changes in temperature, for actuating the thermostatic switch.

A still further object of my invention is to provide an improved construction of adjustment means for a mercury switch thermostat by which a thermostatic element may be adjusted in effective position to actuate at a predetermined temperature for imparting movement to a mercury switch member for opening or closing an electrical circuit at the adjusted temperature.

Other and further objects of my invention reside in the simplified construction of mercury switch adjustable thermostat as set forth more fully in the specification hereinafter following by reference to the accompanying drawings in which:

Figure 1 is a front elevational view of the mercury switch thermostat constructed in accordance with my invention with the mercury switch shown in circuit open position;

Figure 2 is a side elevational view of the mercury switch thermostat illustrated in Figure 1;

Figure 3 is a top plan view of the mercury switch thermostat of Figures 1 and 2;

Figure 4 is a vertical sectional view taken substantially on line 4—4 of Figure 1;

Figure 5 is an enlarged transverse sectional view taken substantially on line 5—5 of Figure 1;

Figure 6 is a front elevational view of the thermostat of my invention moved to actuated or circuit closing position;

Figure 7 is a detail front elevational view of the rotor member which supports the mercury contactor and serves to complete the electrical connections thereto;

Figure 8 is a side elevational view of the rotor illustrated in Figure 7;

Figure 9 is a vertical sectional view taken substantially on line 9—9 of Figure 7;

Figure 10 is a horizontal sectional view taken substantially on line 10—10 of Figure 7; and Figure 11 shows a modified arrangement of the rotor for supporting two mercury switch devices for control by the thermostat.

My invention is directed to an improved construction of mercury switch thermostat of high sensitivity. The thermostat is adjustable over a relatively wide temperature range for actuating the mercury switch at a predetermined adjusted temperature. I provide an arrangement of rotor which carries one or more mercury switch elements and in which flexible leads from the mercury switch connect to commutator elements electrically connected through the supporting frame to the circuit to be controlled.

The thermostat element is mounted on an angularly shiftable lever member which is, in turn, pivotally coupled with an angularly shiftable indicator arm which is adjustable over a graduated scale calibrated to enable the adjustable arm to be set at that temperature at which the mercury switch is to be actuated. The structure of my invention has been found to be highly accurate and precise in its operation despite the simplicity of its design and production.

Referring to the drawings in more detail, reference character 1 designates a base of insulation material for supporting the parts of the thermostat, the base carrying adjacent the upper end thereof a scale member 2 having graduations 3 thereon calibrated in degrees over the temperature range over which the thermostat operates. The graduations are radially inclined toward a center indicated at 4 which is the pivotal point for the adjustable arm 5. At the center 4, which is an aperture in support 1, I provide a centering bolt member 6 having a headed end which serves to confine the adjustable arm 5 in pivotal position. A suitable spacer member 7 is disposed between the adjustable arm 5 and the support 1 so that the adjustable arm 5 is free to be angularly shifted to any desired position over the scale 3. The adjustable arm 5 is formed at the end 5a thereof into a radially extending knife edge forming with the pointer 5b an end portion for the adjustable arm which may be precisely aligned with a selected graduation on the scale 2 in setting the thermostat for operation at a predetermined temperature.

The opposite end of the adjustable arm 5, beyond the pivoted position provided by bolt member 6, is bifurcated, as represented at 5c, to embrace the circular headed member 8 carried by the pivotally mounted lever member 9 which is pivoted on member 10 adjacent the end of support 1. The upper end of lever 9 extends beneath the bifurcated end of the adjustable arm 5, thus leaving the adjustable arm 5 free to swing over the end of lever 9 with minimum friction. By setting the adjustable arm 5 at a particular angular position, indicated by the graduations 3 on the scale 2, lever 9 may be angularly positioned in a selected position on either side of the longitudinal center through the support 1.

The lever 9 carries an insulating support 11 adjacent the pivotally mounted end thereof and offset at one side thereof so that one plane surface of the insulating support 11 is substantially aligned with the longitudinal center of lever member 9. This location of the insulating support 11 enables the thermostatic bi-metallic temperature-sensitive strip 12 to be supported at the lower end thereof precisely along the longitudinal center line of the lever member 9. The bi-metallic temperature-sensitive strip 12 is secured to the insulating support 11 by means of securing screws 14 which maintain the bi-metallic temperature-sensitive strip 12 in a position extending in a substantially vertical direction with the opposite sides thereof exposed to the circulation of air or gases to which the bi-metallic temperature-sensitive strip 12 responds. The upper end of the strip 12 is cut away, as represented at 12a, and terminates in an upwardly directed tongue 12b which serves to support the pin member 15 which is directed inwardly toward the support 1. The mercury switch contactor, which is controlled by the bi-metallic strip 12, is mounted in a unique manner with respect to support 1.

Referring more particularly to Figure 5, it will be seen that two transversely extending plate members 16 and 17 are mounted in spaced position with respect to support 1 by means of screw members 18 and 19. The screw members 18 and 19 are thoroughly insulated from the transversely extending plate members 16 and 17 by an arrangement of sleeve-like bushings of insulation material, which I have represented at 20 and 21, projecting into the recesses in the support members 22 and 23 located between the transversely extending plate members 16 and 17, as shown.

I provide metallic sleeve members 24 and 25 extending from the support 1 and projecting through spacer members of insulation material, shown at 26 and 27, and projecting through apertures in the transversely extending plate member 16 and into aligning recesses formed in insulated spacer members 22 and 23, as represented at 22a and 23a. Nut members 18a and 19a serve to secure the screw members 18 and 19 in position for clamping transversely extending plate members 16 and 17 in spaced position and in insulated relation one to the other. It will be observed that between insulated bushing 22 and transversely extending plate member 16 there is clamped the end of the terminal lug represented at 28, while between the transversely extending plate member 17 and the end of the insulated bushing 23 there is clamped the end of the lug 29 and, thus, electrical connection may be established to both the transversely extending plate member 16 and the transversely extending plate member 17. These transversely extending plate members 16 and 17 serve as terminals for opposite sides of the rotor member indicated generally at 30.

The rotor 30 is of laminated construction and is formed by a pair of electrical conductive circular plates 31 and 32 each of which has stub shafts 33 and 34 secured therein and projecting axially in opposite directions therefrom with their ends electrically insulated from each other by the central plate of insulation material represented at 35. The central plate of insulation material is perforated at 35a and 35b for the passage of a coupling pin 36 extending from plate 31 and coupling pin 37 extending from the plate 32. The coupling pins 36 and 37 terminate short of the thickness of the central plate of insulation material 35 and, thus, while serving as driving means, do not cause a short circuit between plate members 31 and 32. Thus, plate members 31 and 32 constitute opposite sides of the electrical circuit leading from the mercury switch represented by mercury tube 39 supported in the substantially cylindrical carrier 40 which is coextensive with the bracket portion 40a thereof and which is secured to the end of stub shaft 34. The mercury tube 39 includes a pair of electrical terminals 39a therein, adapted to be electrically bridged by the globule of mercury 39b when the mercury tube is angularly shifted to a position in which the globule of mercury 39b gravitates to the end of mercury tube containing the terminals 39a, as represented in the position of the device shown in Figure 6. Flexible leads 41 and 42 extend from the terminals 39a and enter sockets 32a and 31a in plate members 32 and 31 of the rotor 30 extending through diametrically disposed apertures in the stub shafts 34 and 33. Thus, direct electrical connection is made through the leads extending from terminals 39a of the mercury switch 39 to the rotor plates 32 and 31 and thence to stub shafts 34 and 33 without employment of sliding contact brushes. Good electrical connection is made between stub shafts 33 and 34 and transversely extending plate members 16 and 17 by precision mounting of the stub shafts 33 and 34 in bearings 16a and 17a formed in the transversely extending plate members 16 and 17. These bearings have relatively wide surface contact with the stub shafts and, in addition, each stub shaft is provided with a frusto-conical shaped annular zone indicated at 33a and 34a which bear directly against the inner faces of the plates 16 and 17, forming a continuous and good electrical connection therewith. This arrangement permits the lugs 28 and 29, which connect respectively with the plates 16 and 17, to establish good electrical connection through conductors 43 and 44 which pass through apertures 43a and 44a in support 1 for connection to the device to be controlled.

In lieu of the single mercury switch 39 depicted in Figures 1 to 6, I may provide a multiplicity of mercury switch devices for simultaneous control by the thermostatic device. I have shown in Figure 11 the manner in which a special bracket 45 may be attached to the stub shaft 34 and support at opposite ends thereof the mercury switch tubes 46 and 47. The terminal ends of the mercury switch tubes 46 and 47 are located in diametrically opposite positions so that angular movement of rotor 30 will shift the mercury tubes 46 and 47 to an angular position in which the globules of mercury therein gravitate simultaneously to positions for bridging the circuit terminals in one position or gravitate away from the circuit terminals for opening the said circuits in the opposite position. The multiple control of electrical circuits through a multiplicity of independent mercury contactors operated simultaneously has many important applications.

The manner of actuating the rotor 30 by flexing of the bi-metallic strip 12 will be more fully understood by reference to Figures 4, 7 and 9, from which it will be observed that the conductive plate members 31 and 32 and the central plate member 25 are all provided with a series of radially disposed slots 32b, 35b and 31b, all aligned with each other. The pin member 15, carried by the end of bi-metallic strip 12, enters slots 32b and partially enters slot 35b, but does not extend a sufficient distance to establish connection with slot 31b of plate 31. Thus, no short circuit occurs between plates 32 and 31, but an angular displacement of rotor 30 may be effected under control of the flexing of bi-metallic member 12 sufficient to move bracket 40a of carrier 40 to a position for shifting the mercury tube 39 to a position in which globule 39b makes connection with terminals 39a within the mercury tube. The operation is similar when additional mercury tubes are employed such as the two tubes represented in Figure 11.

The fact that the transversely extending conductive plate members 16 and 17 are spaced as an assembly by spacer members 26 and 27 away from support 1 enables the adjustable arm 5 to be freely shifted to the desired angular position in the space 48, as represented more clearly in Figures 3 and 5.

In lieu of the mounting of the lever member 9 and the adjustable arm 5 on the front of the support 1, it is practicable in many instances to mount the lever 9 and the adjustable arm 5 in the rear of the support 1 pivoting the lever 9 to support 1 by member 10, as heretofore explained, and pivoting the adjustable arm 5 to support 1 by member 6, as heretofore explained, to allow the adjustable end of the adjustable arm 5 to project through a slot formed in support 1 for movement over the graduated scale 3, as explained hereinbefore.

The structure of my invention has been found to be highly sensitive in operation. Flexing of the bi-metallic member 12 by movement of pin 15 for angularly shifting the rotor 30 is effected by changes in temperature to which the bi-metallic member 12 is exposed. The structure lends itself particularly to a reversal of the entire process so that, instead of closing an electric circuit under conditions of rise in temperature, the electric circuit may be opened upon such rise by reversing the position of the bracket 40a, the carrier 40 and the mercury tube associated therewith. Thus, the device may be used under conditions of either increase or decrease in temperature in a reverse manner. Angularly positioning the lever member 9 is determinative of the position of the bi-metallic member 12 and thereby fixes the metallic relation of the end of the bi-metallic member 12 and the rotor 30. The bi-metallic member 12, in expanding and contracting, imparts proportional angular movement of rotor 30. The process is a continuous one, and, as bi-metallic member 12 is restored to its original position, corresponding restoration of the mercury switch is effected.

While I have found the structure of my invention, as explained herein, highly desirable in manufacture, production and operation, I realize that modifications in details of construction may be made, and I desire it to be understood that no limitations upon my invention are intended other than may be imposed by the scope of the appended claims.

What I claim as new and desire to secure by Letters Patent of the United States is as follows:

1. A thermostatic electric circuit controller comprising a base of insulation material, a frame structure insulatingly supported with respect to said base, said frame structure comprising a pair of electrically conductive plate members, spacer members disposed between opposite ends of said plate members, a rotor journaled intermediate said plate members, a capsule enclosed mercury switch device carried by said rotor and operative in one angular position to close an electrical circuit and in another position to open the electrical circuit, a lever member adjustably mounted on said base, a member of insulation material carried by said lever member a thermo-sensitive element connected to said member of insulation material at one end and to said rotor at the other end for imparting angular movement to said mercury switch under conditions of variable temperature and electrical connections extending from said switch through said rotor to said electrically conductive plate members, whereby said plate members serve as terminals for said switch.

2. A thermostatic electric circuit controller comprising a base of insulation material, a frame structure insulatingly supported with respect to said base, said frame structure comprising a pair of electrically conductive plate members, spacer members disposed between opposite ends of said plate members, a rotor journaled intermediate said plate members, a capsule enclosed mercury switch device carried by said rotor and operative in one angular position to close an electrical circuit and in another position to open the electrical circuit, a lever member pivotally mounted at one end thereof on said base, a member of insulation material carried by said lever member, a thermo-sensitive element supported at one end on said member of said insulation material and connected at the other end with said rotor for imparting angular movement to said mercury switch under conditions of variable temperature, means for angularly adjusting the position of said lever member, and electrical connections extending from said switch through said rotor to said electrically conductive plate members whereby said plate members serve as terminals for said switch.

3. A thermostatic electric circuit controller comprising a base of insulation material, a frame structure insulatingly supported with respect to said base, said frame structure comprising a pair of electrically conductive plate members, spacer members disposed between opposite ends of said plate members, a rotor journaled intermediate said plate members, a capsule enclosed mercury switch device carried by said rotor and operative in one angular position to close an electrical circuit and in another position to open the electrical circuit, a lever member pivotally mounted at one end on said base, an adjustable arm pivotally mounted on said base and establishing pivotal connection with the other end of said lever member, a standard of insulation material carried by said lever member, a thermo-sensitive element connected with said standard at one end and connected with said rotor at the other end for imparting angular movement to said mercury switch under conditions of variable temperature, and electrical connections extending from said switch through said rotor to said electrically conductive plate members whereby said plate members constitute terminals for said switch.

4. A thermostatic electric circuit controller comprising a base of insulation material, a frame structure insulatingly supported with respect to said base, said frame structure comprising a pair of electrically conductive plate members, spacer members disposed between opposite ends of said plate members, a rotor journaled intermediate said plate members, a capsule enclosed mercury switch device carried by said rotor and operative in one angular position to close an electrical circuit and in another position to open the electrical circuit, a lever member pivotally mounted at one end on said base, an adjustable arm pivotally mounted intermediate its ends on said base and pivotally connected at one end to said lever member and terminating in an indicator pointer at the other end a calibrated scale carried by said base adjacent the last mentioned end of said adjustable arm for indicating in coaction with said indicator pointer a temperature setting at which a selected position of said adjustable arm over said calibrated scale operates to angularly displace said lever member, a standard of insulation material carried by said lever member, a thermo-sensitive element secured at one end to said standard and at the other end to said rotor for imparting angular movement to said mercury switch under conditions of variable temperature, and electrical connections extending from said switch through said rotor to said electrically conductive plate members whereby said plate members constitute terminals for said switch.

5. A thermostatic electric circuit controller comprising a base of insulation material, a frame structure insulatingly supported with respect to said base, said frame structure comprising a pair of electrically conductive plate members, spacer members disposed between opposite ends of said plate members, a rotor journaled intermediate said plate members and comprising a disc of insulation material, a pair of conductive discs disposed on opposite sides of the aforesaid disc, a stub shaft carried by each of said conductive discs and projecting substantially normal thereto through journals in said plate members with said disc of insulation material interposed between the inner ends of said stub shafts, a bracket member carried by one of said stub shafts, a mercury switch supported by said bracket member, electrical connections extending from said mercury switch to the respective conductive discs, terminals electrically connected with said conductive plate members, and a thermo-sensitive element insulatingly supported at one end with respect to said base and connected at the other end with said rotor for imparting angular movement to said mercury switch under conditions of variable temperature.

6. A thermostatic electric circuit controller comprising a base of insulation material, a frame structure insulatingly supported with respect to said base, said frame structure comprising a pair of electrically conductive plate members, spacer members disposed between opposite ends of said plate members, a rotor journaled intermediate said plate members, and comprising a disc of insulation material, a pair of conductive discs disposed on opposite sides of the aforesaid disc, a stub shaft carried by each of said conductive discs and projecting substantially normal thereto through journals in said plate members with said disc of insulation material interposed between the inner ends of said stub shafts, a bracket member carried by one of said stub shafts, a mercury switch supported by said bracket member, electrical connections extending from said mercury switch to the respective conductive discs, terminals electrically connected with said conductive plate members, a thermo-sensitive element supported at one end on said base, and means connecting the other end of said thermo-sensitive element with said rotor for imparting angular movement to said mercury switch under conditions of variable temperature.

7. A thermostatic electric circuit controller comprising a base of insulation material, a frame structure insulatingly supported with respect to said base, said frame structure comprising a pair of electrically conductive plate members, spacer members disposed between opposite ends of said plate members, a rotor journaled intermediate said plate members and comprising a disc of insulation material, a pair of conductive discs disposed on opposite sides of the aforesaid disc, a stub shaft carried by each of said conductive discs and projecting substantially normal thereto through journals in said plate members with said disc of insulation material interposed between the inner ends of said stub shafts, a bracket member carried by one of said stub shafts, a mercury switch supported by said bracket member, electrical connections extending from said mercury switch to the respective conductive discs, terminals electrically connected with said conductive plate members, a thermo-sensitive element supported at one end on said base and free to flex at the other end thereof, a transverse pin carried by the free and of said thermo-sensitive element and projecting through a slot formed in said rotor for imparting angular movement to said mercury switch under conditions of variable temperature.

8. A thermostatic electric circuit controller comprising a base of insulation material, a frame structure insulatingly supported with respect to said base, said frame structure comprising a pair of electrically conductive plate members, spacer members disposed between opposite ends of said plate members, a rotor journaled intermediate said plate members and comprising a disc of insulation material and a pair of conductive discs disposed on opposite sides of the aforesaid disc, a stub shaft carried by each of said conductive discs and projecting substantially normal thereto through journals in said plate members with said disc of insulation material interposed between the inner ends of said stub shafts, a bracket member carried by one of said stub shafts, a mercury switch supported by said bracket member, electrical connections extending from said mercury switch to the respective conductive discs, terminals electrically connected with said conductive plate members, a thermo-sensitive element supported at one end on said base and free for angular displacement at the other end thereof, a transverse pin carried by the free end of said thermo-sensitive element and projecting through a slot formed in said rotor for imparting anguular movement to said mercury switch under conditions of variable temperature, and means for keying said conductive discs to said disc of insulation material for insuring simultaneous movement of all of the discs constituting said rotor.

RUSSELL ANDREW GRADEN.

No references cited.